UNITED STATES PATENT OFFICE.

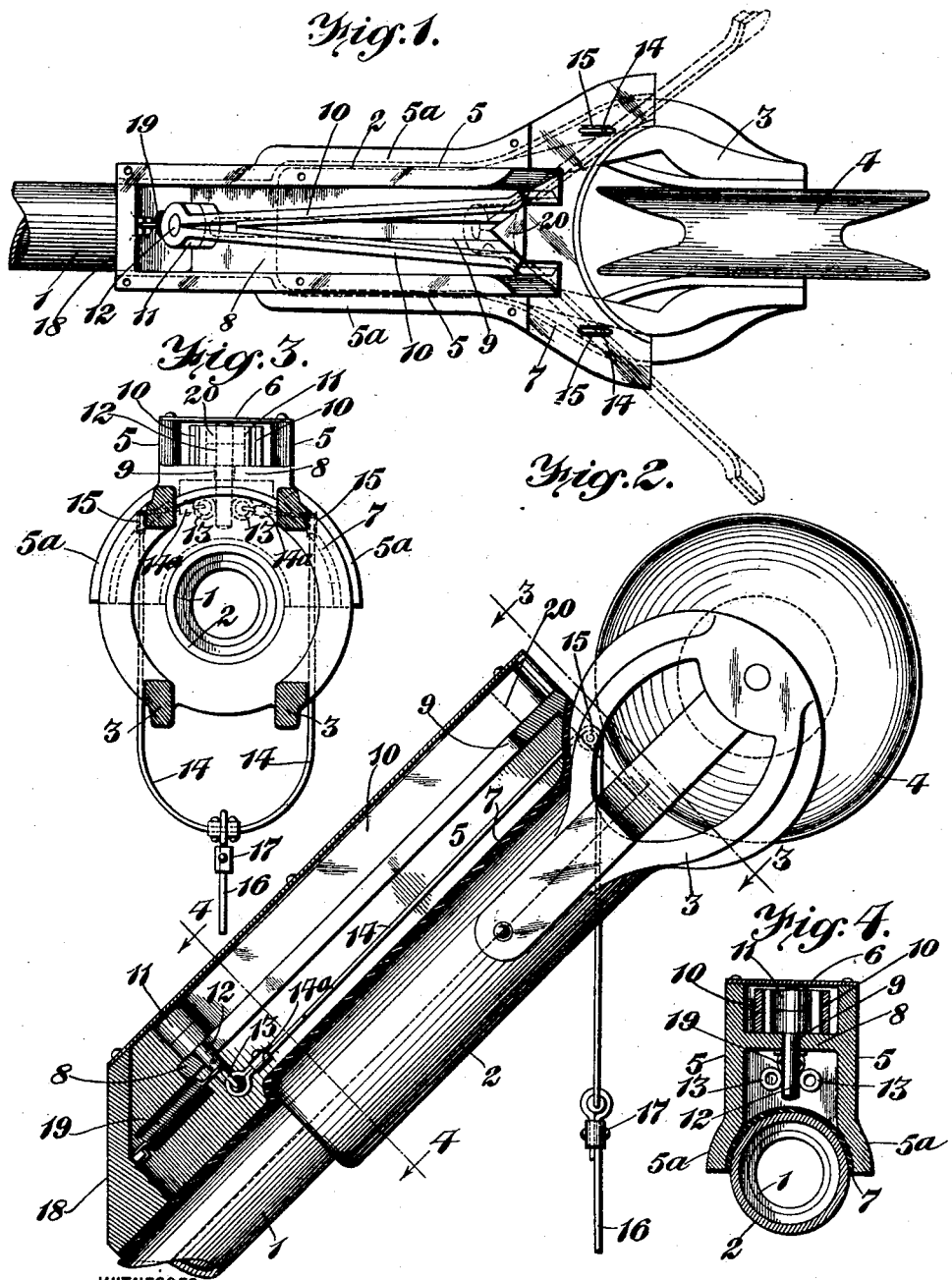

JOHN W. OMAN, OF ST. LOUIS, MISSOURI, ASSIGNOR OF TWO-THIRDS TO WILLIAM SACKS, OF ST. LOUIS, MISSOURI.

ATTACHMENT FOR TROLLEY-POLES.

1,198,385.  Specification of Letters Patent.  Patented Sept. 12, 1916.

Application filed September 25, 1914, Serial No. 863,469. Renewed July 31, 1916. Serial No. 112,458.

*To all whom it may concern:*

Be it known that I, JOHN W. OMAN, a citizen of the United States, residing in the city of St. Louis and State of Missouri, have invented a new and useful Attachment for Trolley-Poles, of which the following is a specification.

This invention relates to attachment for trolley poles and more particularly for an attachment adapted to guide the trolley wire whereby the same is readily seated in the groove of the trolley wheel.

An object of the invention is to provide an attachment adapted to be secured to the trolley pole adjacent to the trolley harp for guiding the trolley wire to its seat in the groove of the trolley wheel, supported by the harp.

Another object of the invention is to provide a device of the character mentioned comprising a pair of spreading arms adapted to be raised at either side of the trolley wheel for the purpose of guiding the trolley wire to its seat in the groove of the trolley wheel, and so arranged that when in inoperative position said arms will seat within a housing from which position they are elevated by manipulation of the trolley rope.

With these and other objects in view I have designed, combined and arranged the several coöperating parts hereinafter more particularly specified, reference being made to the accompanying drawings in which—

Figure 1 is a plan view of the upper part of a trolley pole provided with a usual trolley harp and wheel mounted therein, with a device of the present invention applied thereto, the upper wall of the housing being removed to show the interior construction, and the guiding arms being shown in elevated position in dotted lines. Fig. 2 is a longitudinal section of the device of the present invention applied to a trolley pole, which is shown in elevation with the trolley harp and wheel mounted therein. Fig. 3 is a cross section taken substantially on the line 3—3 of Fig. 2 and Fig. 4 is a cross section taken substantially on the line 4—4 of Fig. 2.

In the embodiment of the invention as illustrated in the drawing, I have shown a section of a trolley pole 1 upon the upper end of which is mounted a trolley harp 2 between the arms 3 of which is mounted a trolley wheel 4.

The device of the present invention is adapted to be attached to the front face of the trolley pole and comprises a housing including side walls 5 and a removable top plate 6. The side walls are arranged so as to conform to the contour of the shank of the trolley harp and of the trolley pole upon which the shank is mounted, by providing extensions 5ª which substantially embrace one half of the periphery of the trolley harp shank and of the trolley pole.

In order to insulate the attachment from the trolley pole I prefer to provide a layer of insulating material 7 which is interposed between the attachment and the trolley pole. Any suitable clamping means may be utilized for securing the housing for the attachment in position.

Within the housing and supported by the side walls 5 thereof is a transverse partition wall 8 which is provided with a longitudinal slot 9. A pair of arms 10, provided with knuckles 11 are adapted to be mounted in said housing between the upper face of the partition wall 8 and the inner face of the plate 6. A pintle 12 passes through the knuckles 11 of the arms 10 and extends through the slot 9 in the partition wall 8, said slot constituting a guide for the pintle 12. To the portion of the pintle 12 that extends below the partition wall 8 is secured a pair of eyes 13. Into each eye 13 is connected one end of a rope or cord 14 which rope or cord 14 extends through sheaves 15 rotatably mounted in the upper part of the housing. The means that I have illustrated for securing the ends of the loop of rope or cord 14 to the eyes 13, comprise clamp eyes 14ª applied to the ends of the rope. A trolley rope or cord 16 has connection with the base of a loop of rope or cord 14 preferably by means of a clamp eye 17.

The end of the housing, which is preferably in the form of a block 18 with an exteriorly inclined wall, has attached to the inner face thereof one end of a retractile spring 19, the other end of which is secured to the pintle 12. This spring provides means for normally drawing the pintle, and thereby the arms 10, to a position within the housing, the downward movement of the pintle being limited by the end of the slot 9. When the trolley rope 16 is pulled downwardly the pintle 12 is moved to the upper end of the slot 9 against the tension of the spring 19 and the arms 10 are moved outwardly through the upper end of the housing, being spread apart by a V-shaped spreading block 20 extending downwardly from a portion of the upper wall of the housing and are carried to a position indicated in dotted lines in Fig. 1 of the drawings. When the pintle 12 has been moved to the upper end of the slot 9 it engages against the upper wall of the slot, and further pull on the trolley rope 16 lowers the trolley pole, the arms 10 being held in spread position at either side of the trolley wheel. When the end of the trolley pole is lowered below the trolley wire and the pull on the trolley rope is released, the wire is caught between the spread of the arms 10 and as the arms move downwardly within the housing the pole is centered and the wire guided over the edge of the trolley wheel into the slot thereof.

It will be apparent that as the spread of the arms is greatly in excess of the width of the groove of the trolley wheel, that the replacement of the trolley wheel on the wire is greatly facilitated.

From the foregoing explanation the operation of the device will be readily comprehended and it will also be apparent that modifications in the design and structure of the parts may be made without departing from the spirit and scope of the invention. I do not desire to limit myself, therefore, to exact details but—

What I desire to secure by Letters Patent is:

1. An attachment for trolley poles, comprising a housing, a partition wall in said housing, a pair of arms adapted to rest on said partition wall within said housing, a pintle constituting a pivot for said arms, a spring normally retracting said pintle to the lower end of said housing, a trolley rope, a connection between said pintle and the trolley rope and means for spreading said arms obliquely outwardly at either side of the trolley wheel when a pull is exerted on the trolley rope in opposition to said spring, substantially as specified.

2. An attachment adapted to be mounted on the upper face of a rearwardly inclined trolley pole comprising a pair of relatively movable arms, means normally holding said arms in folded adjustment below the trolley wire, a trolley rope connected to said arms and means for spreading said arms obliquely outwardly at either side of the trolley wire when a pull is exerted on said trolley rope, substantially as specified.

3. The combination with a trolley pole, of an attachment adapted to be applied to the upper front face thereof, comprising a pair of relatively movable arms, means normally holding said arms in folded adjustment below the trolley wire, a trolley rope and means for spreading said arms obliquely outwardly at either side of the trolley wire when a pull is exerted on said trolley rope, substantially as specified.

4. An attachment for trolley poles, comprising a housing, a pair of arms mounted in said housing and movable outwardly through one end thereof, a pintle pivoting the lower ends of said arms together, a spring holding said arms within said housing, a flexible connection for moving said arms outwardly through one end of said housing in opposition to said spring and an element spreading the outer ends of said arms apart when said arms are moved by said flexible connection as aforesaid.

5. The combination with a trolley pole, of a pair of arms movable longitudinally with respect to said trolley pole, a pintle pivoting the lower ends of said arms together, a spring holding said arms in folded adjustment, a flexible connection for moving said arms longitudinally with respect to said trolley pole in opposition to said spring, and a spreading element for spreading the outer ends of said arms apart when said arms are moved by said flexible connection, substantially as specified.

6. An attachment for trolley poles, comprising a pair of arms pivoted together at one end, means normally holding said arms in folded adjustment below the trolley wire, a flexible connection for moving said arms and means for spreading said arms obliquely outwardly when moved by said flexible connections, substantially as specified.

7. An attachment for trolley poles, comprising a pair of arms pivotally supported at their inner ends, means normally holding said arms in folded adjustment with the outer ends thereof below the upper edge of the trolley wheel, a flexible element operatively connected to said arms, and means for moving said arms outwardly and laterally to spread the outer ends thereof apart at either side of the upper edge of the trolley wheel when a pull is exerted on said flexible element.

In witness whereof, I have signed this specification in the presence of two subscribing witnesses.

JOHN W. OMAN.

Witnesses:
L. C. KINGSLAND,
R. M. LAWRENCE.

Copies of this patent may be obtained for five cents each, by addressing the "Commissioner of Patents, Washington, D. C."